United States Patent Office 3,140,658
Patented July 14, 1964

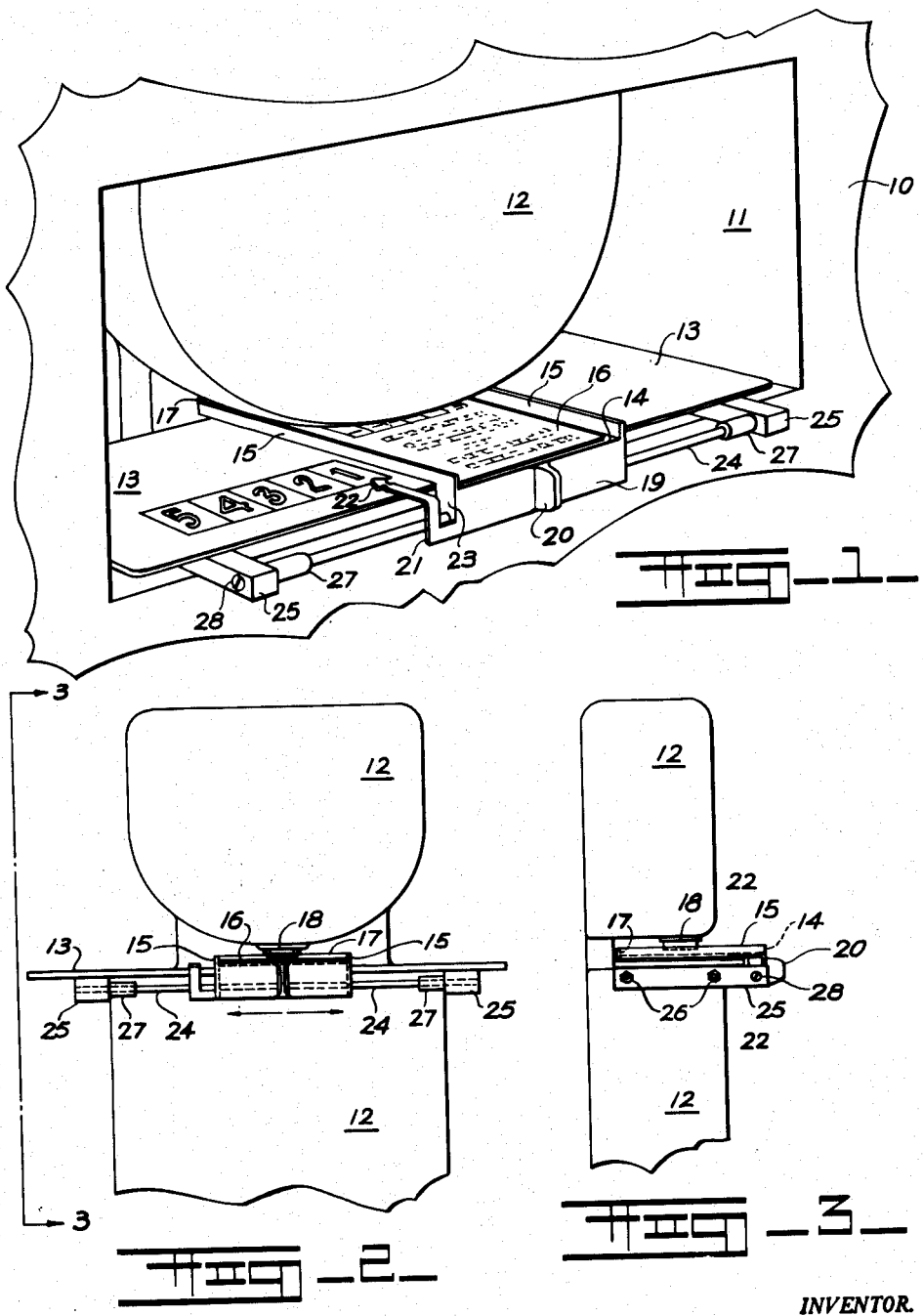

3,140,658
TRUCK SCALE WEIGHT CARD HOLDER
Jay E. Marshall, Box 486, Silica Road,
North Jackson, Ohio
Filed Nov. 22, 1961, Ser. No. 154,192
1 Claim. (Cl. 101—407)

This invention relates to a truck weighing scale and more particularly to a scale arranged to weigh the individual axles of a truck or a tractor-trailer combination and print the weight of each axle on a weight record card.

The principal object of the invention is the provision of a device for receiving and holding a truck axle weight record card and presenting the same to the printing head of a truck weighing scale.

A further object of the invention is the provision of means of insuring the accurate positioning of a truck weight record card with respect to the printing head of a truck axle weighing scale.

A still further object of the invention is the provision of a simple and efficient record card holder for use with a truck axle weighing scale having a weight printing head.

The truck weight record card holder disclosed herein comprises a device for holding and properly presenting a truck weight record card to the printing head of a truck axle weighing scale such as used publicly by various truckers to provide a written record of the actual weight of the truck and load.

In truck weighing scales heretofore known in the art, printing devices have been used and record cards or sheets supplied upon which the weights of the individual axles of the truck are printed by the scale. These printing devices have made it necessary for the operator, usually the trucker, to position a record card or paper beneath the printing head of the device in a correct position and then actuate the mechanism of the scale to print the weight of the truck axle on the weighing platform of the scale. The truck is then moved to bring the next axle onto the weighing platform and the operation repeated. The printing heads of the devices are inverted and the actual printing area of the same is hidden from view and it is difficult and sometimes nearly impossible to accurately position the record card or paper so that the printing head of the device will print the weight in the desired location thereon. The present invention eliminates these problems by providing a simple and efficient record card holder which provides a positive means of locating the record card upon which the weights of the several axles are to be printed and then provides means for positively positioning the record card holder relative to the printing head of the device so that the weights are always printed in their desired locations.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a perspective view of a portion of a truck axle weighing scale house showing an access window therein with the printing device and weight record card holder in position therebeneath.

FIGURE 2 is a front view of the printing device of the scale with parts broken away and showing the weight card holder in position relative to the printing head thereof.

FIGURE 3 is a side view taken on line 3—3 of FIGURE 2.

By referring to the drawings and FIGURE 1 in particular, it will be seen that a portion of a wall 10 of a scale house is shown and that a window area 11 is located therein to provide access to the printing device 12 of a truck axle weighing scale which comprises a weighing mechanism as known in the art operated by a weighing platform (not shown) and controlled by a coin operated mechanism (not shown). The printing device 12 is part of a scale of the type referred to as a public truck scale and is available to anyone needing to use the same and is usually coin controlled. A supply of truck weight record cards usually approximately 8" x 5" in size are provided which have printed indicia noting the location of the scale and includes areas thereon for receiving the printed axle weights as determined and printed by the printing device 12 of the scale, as known in the art. The scale is provided with a platform 13 and means for presenting a record card to the printing device 12, said means comprises a record card receiving and holding member 14 positioned slidably slightly above said platform 13 and which record card receiving member 14 comprises a flat rectangular member having parallel horizontally spaced vertically extending side guides 15, 15 thereon. A weight record card 16 is shown in position on the card holding member 14 between the side guides 15, 15 and against a vertical back guide 17.

It will be seen that the printing device 12 includes a printing head 18 which depends below the major portion of the printing device 12 and is positioned directly above the record card holding member 14. The forward end of the card holding member 14 is flanged downwardly as at 19 and provided with a centrally located forwarding projecting operating tab 20. An extension 21 of the flange 19 extends sidewardly therefrom and upwardly and then inwardly and terminates in an arrow or other suitable indicator 22 which overlies the platform 13 at one side of the card holding member 14 and in a position to be brought into alignment with a transversely arranged plurality of weight locations printed on the weight record card 16. The flange 19 has inturned side portions 23, 23 which are apertured and engaged upon a guide rod 24 which extends transversely in spaced parallel relation to the front edge of the platform 13 between a pair of support arms 25, 25. The inner ends of the support arms 25, 25 are secured as by fasteners 26, 26 to the body of the scale. Tubular cushions 27, 27 are positioned on either end of the rod 24 and provide properly spaced stops for the inturned sides 23 of the flange 19 and thereby effectively control the position of the record car holding member 14 with respect to the printing head 12 of the scale. The ends of the rod 24 are drilled and threaded and fasteners 28, 28 are positioned through the arms 25, 25 so as to secure the rod 24 in position therein. Alternately, the arms 25, 25 may be apertured on one side only the ends of the rod 24 caged therein.

In operating the device a trucker parks a truck with one of the axles on the weighing platform (not shown), enters the scale house, positions a truck weight record card 16 on the card holding member 14 and moves the member 14 by the tab 20 to a position where the arrow 22 registers with the numeral 1, which action positions the record card 16 in proper position beneath the printing head 18 of the scale printing device 12. He then deposits a coin in the coin operated control mechanism (not shown) whereupon the scale printing device 12 and the printing head 18 prints the weight of the axle in the proper location on the card 16. The trucker then moves the truck to bring the next axle onto the weighing platform, re-enters the scale house, moves the card holding member 14 to position the arrow 22 at numeral 2, deposits another coin and the scale printing device 12 and head 18 print the weight of the second axle in the second location on the card 16. This cycle is repeated until all of the truck and/or tractor and trailer axles are weighed and their weight recorded. The trucker then removes the weight record card 16 and has available written legal evidence of the actual weight of the truck, axle by axle, either for the purpose of determining the weight of the load or the total weight of the loaded truck or tractor and trailer combination. Such truck weight record cards are accepted by the various State Highway Patrols when the trucks are stopped for weight inspection and save the trucker the time of submitting to another weighing operation to prove the weight of the truck and load.

It will thus be seen that the present invention provides a positive yet simple and easily operated device for properly positioning the truck weight record card 16 relative to the printing head 18 of the scale printing device 12 so that a clear and unmistakable weight record on an axle by axle basis of the truck is provided, and having thus described my invention, what I claim is:

A device which is designed to receive a record card and selectively present said record card to a printing head of a printing scale, said device comprising:

(a) a card receiving and holding member,
(b) guide members on the sides and back of said card receiving and holding member for locating and retaining said record card thereon,
(c) a rod on said scale positioned transversely thereof,
(d) a portion of said card receiving and holding member having a downwardly flanged portion with inturned side portions which have apertures formed therein slidably engaging said rod,
(e) indicia on said scale alongside said printing head,
(f) an indicator on said card receiving and holding member arranged to terminate adjacent said indicia in registering relation therewith,
(g) said card receiving and holding member being arranged to move along a straight line transverse path relative to said printing head, and
(h) means on said rod limiting movement of said card receiving and holding member.

References Cited in the file of this patent

UNITED STATES PATENTS

| | | |
|---|---|---|
| 1,684,934 | Woodworth | Sept. 28, 1928 |
| 1,948,911 | Gardner | Feb. 27, 1934 |
| 2,482,726 | Clements | Sept. 20, 1948 |
| 2,746,738 | Reiser | May 22, 1956 |
| 2,779,275 | Spainhour | Jan. 29, 1957 |
| 2,928,343 | Mintz | Mar. 15, 1960 |
| 3,075,460 | Adler | Jan. 29, 1963 |